PROCESS FOR THE PREPARATION OF PHOSPHOR-CONTAINING HETEROCYCLIC COMPOUNDS

Jan Hendrik Uhlenbroek and Bernardus Gerhardus van den Bos, Weesp, Netherlands, assignors to North American Philips Company Inc., New York, N.Y., a corporation of Delaware
No Drawing. Filed Feb. 1, 1960, Ser. No. 5,592
Claims priority, application Netherlands Nov. 9, 1959
9 Claims. (Cl. 167—33)

This invention relates to new and novel phosphorous containing heterocyclic compounds, to methods of preparing these compounds and to the use of said compounds as pesticides.

One of the most important needs in agriculture is for a good all purpose pesticide that would be effective against crop destructive insects, mites and fungi while being relatively non-toxic for warm blooded animals. It has been particularly difficult to produce compounds that are effective against both fungi and mites especially the red spider mite.

It is a principal object then of this invention to produce new and novel phosphorus containing heterocyclic compounds.

It is another principal object of this invention to provide new chemical compounds that are useful for the destruction of plant harmful pests and which are relatively harmless to warm blooded animals.

According to the invention new and novel phosphorus containing heterocyclic compounds are provided. These compounds correspond to the general formula:

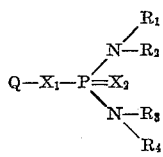

wherein Q represents a radical containing a single heterocyclic ring which may be fused to a benzene ring in which heterocyclic ring oxygen is the only hetero atom present in the ring and in which heterocyclic ring one of the carbon atoms is substituted by the keto group, $X_1$ represents a member of the group consisting of oxygen and sulfur joined to a carbon atom of the heterocyclic ring, $X_2$ represents a member of the group consisting of oxygen and sulfur and $R_1$, $R_2$, $R_3$ each represent a lower alkyl radical.

In these compounds the heterocyclic radical represented by Q may be a single heterocyclic ring containing oxygen atoms as the only hetero atoms ring in which one of the carbon atoms is substituted by a keto group, a condensation product of such a heterocyclic ring with the benzene ring or lower alkyl and alkoxy derivatives thereof. Thus Q may be the radical of tetronic acid 1,2-pyrone, 1,4-pyrone, 1,2-benzopyrone, 1,4-benzopyrone, 2,3-benzopyrone, 2,6-dimethyl-γ-pyrone, 2,6-diethyl-γ-pyrone, 5-ethoxy-γ-pyrone, 2-methoxy-6-methyl-γ-pyrone, 5-methoxy-2-methyl-γ-pyrone, 5,8-dimethyl-chromone, 5,8-dimethoxy-2-methyl chromone, 2,3-dimethyl-chromone, 2,8-dimethyl-chromone, 2,6-dimethyl-chromone, 2,7-dimethyl-chromone, 7-methoxy-2,3-dimethyl-chromone, 7-methoxy-2-methyl-chromone, 7-methoxy-2,3,8-trimethyl-chromone, 3 - methyl - chromone, 2 - ethoxy - chromone, 3 - butoxy - chromone, 3,4 - pentoxy - chromone, 2 - furanone, maleic anhydride, butyl-maleic anhydride, ethyl-maleic anhydride, isobutyl-maleic anhydride, isopropyl-maleic anhydride, tetronic acid, α-methyl tetronic acid or p-tolyl-maleic anhydride.

The novel compounds of the invention are excellent insecticides, fungicides and acaracides and are particularly useful in the destruction of the red spider mite and mildew while being relatively non-toxic to warm-blooded animals. A preferred group of these compounds are those in which Q represents the radical of a lower alkyl or lower alkoxy γ pyrone. This preferred group is particularly effective against moulds. For example, in experiments on barley mildew the contact activity of bis (N,N - dimethylamido)-O - (2-ethoxy-3,5-dimethyl)-1,4-pyronyl)-6-phosphate was shown to be ten times as great as 2,4-dinitro-6-(1'-methylheptyl) - 1 - phenylcrotonate. Furthermore this novel compound is relatively non-toxic for warm-blooded animals ($LD_{50}$ mouse=100–316 mg. per kg.).

The preparation of the compounds according to the invention may be carried out so that the amidophosphoryl radical or the amidothionophosphoryl radical is introduced in one stage, or in two reaction stages. Thus according to one process of the invention the compound Q—$X_1$—H, preferably in the presence of an hydrohalide acid binding agent, or the compound Q—$X_1$—Me in which formula Q and $X_1$ have the indicated meanings, and Me indicates an alkali metal atom, preferably sodium or potassium, is reacted with a compound of the formula

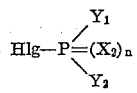

in which formula Hlg is a halogen atom, such as fluorine, bromine or iodine but preferably chlorine, $X_2$ has the above-identified meaning, $n=0$ or 1 and $Y_1$ and $Y_2$ both represent halogen atoms, preferably chlorine, or $Y_1$ represents the group

and $Y_2$ represents the group

in which groups $R_1$, $R_2$, $R_3$ and $R_4$ have the indicated meanings. If $n=1$ and $Y_1$ and $Y_2$ both represent halogen atoms the resulting product is caused to react with a dialkylamine, preferably dimethylamine. If $n=0$ and $Y_1$ and $Y_2$ both represent halogen atoms, the resulting product is caused to react with a dialklamine, preferably dimethylamine, followed by oxidation if $X_2$ represents oxygen and is caused to react with sulphur if $X_2$ represents sulphur. The reactions with dialkylamine are preferably carried out in the presence of a hydrogen halide binding agent. If $n=0$ and $Y_1$ and $Y_2$ represent the above-indicated nitrogen-containing groups, the resulting product is oxidized, if $X_2$ represents oxygen, and is caused to react with sulphur if $X_2$ represents sulphur.

As hydrogen halide binding agents for the above-indicated reactions there may be employed amines and particularly tertiary amines, for example trialklamines such as triethyl and trimethylamine, and N,N-dialklanilines, and in addition pyridine and particularly homologues thereof, particularly the picolines, lutidines and collidine and mixtures of these substances.

Another group of hydrogen halide binding agents which may be employed comprises compounds of sodium, potassium, magnesium, calcium, barium and zinc, such as oxides, hydroxides, carbonates, bicarbonates, alcoholates, and carboxylic salts. Particularly sodium and potassium alcoholates are suitable, for example sodium etholate, potassium metholate especially in combination with the use of the corresponding alcohols as diluting agents.

As starting materials for the preparation of the compounds according to the invention, compounds of the formula Q—$X_1$—Me, in which Q, $X_1$ and Me have the above-indicated meanings are preferably used and in particular those in which Me represents a sodium atom.

The preparation of the compounds is preferably carried out in the presence of a solvent for the heterocyclic compound which is used as a starting material. Examples of these solvents are aliphatic and particularly aromatic hydrocarbons, such as petroleum ether and benzene and particularly toluene, aliphatic ethers, tertiary amines, nitriles such as acetonitrile, ketones, such as acetone and methylethyl ketone, esters, such as ethylacetate and furthermore, for example, nitrobenzene and carbon tetrachloride. These solvents may also be employed as diluting agents for the compounds of the formula Q—$X_1$—Me when such compounds are employed.

In order that the methods of preparing the novel compounds of the invention may be more readily understood they will be described in greater detail in the following examples:

EXAMPLE I 7 g. of bis (N.N-dimethylamido)-phosphorylchloride were added to 5.6 g. of the sodium derivative of 3,5-dimethyl-2-ethoxy-6-hydroxypyrone-1,4, suspended in 60 cc. of anhydrous toluene, and the resulting mixture was refluxed for 5 hours. The separated sodium chloride was filtered off and the filtrate concentrated by evaporation. The resulting residue dissolved in benzene, the benzene solution washed twice with 5 cc. of water and then dried over sodium sulphate after which the benzene was distilled off in vacuo. After purification, a crystalline substance resulted. Yield: 8.1 gms. (84%). Melting point: 66–68° C.

The Examples II to V described in Table I were carried out in an analogous manner. In this table are successively stated the numbers of the examples, the starting materials, the diluting agents, the reaction temperatures, the yields of resulting product, calculated on the quantities of the initial heterocyclic compound and the physical constants of the resulting product. In the physical constants a melting point is stated if the product is obtained in a solid state.

In Table II, there is shown the name of the compound obtained corresponding to the example in question.

Table I

| No. | Starting materials | Diluting agent | Reaction Temp., ° C. | Yield, Percent | Physical constants |
|---|---|---|---|---|---|
| I | 2-ethoxy-3,5-dimethyl-6-hydroxy-1,4-pyrone. | toluene | about 110 | 84 | S=66–68° C. |
| II | 2-methoxy-3,5-dimethyl-6-hydroxy-1,4-pyrone. | do | do | 44 | (oil). |
| III | 2-methyl-6-hydroxy-1,4-pyrone. | do | do | 36 | (oil). |
| IV | α-methyltetronic acid. | do | do | 31 | S=42–48° C. |
| V | 4-hydroxycoumarin | pyridine | do | 83 | S=65–67° C. |

Table II

| No. | Product |
|---|---|
| I | bis(N,N-dimethylamido)-O-(2-ethoxy-3,5-dimethyl-1,4-pyronyl)-6-phosphate. |
| II | bis(N,N-dimethylamido)-O-(2-methoxy-3,5-dimethyl-1,4-pyronyl)-6-phosphate. |
| III | bis(N,N-dimethylamido)-O-(2-methyl-1,4-pyronyl)-6-phosphate. |
| IV | bis(N,N-dimethylamido)-O-(2-keto-4-methyl-2,5-dihydrofuranyl)-4-phosphate. |
| V | bis(N,N-dimethylamido)-O-coumarinylphosphate. |

The active compounds of the invention may be formulated and employed in the conventional manner for destroying the noxious organisms. Thus they may be mixed with solid carriers, ground to the desired particle size and dusted on the crops. Examples of the solid carriers that may be employed are pipe clay, diatomaceous earth, kaolin, dolomite, talcum, gypsum, bentonite, attapulgite, kieselguhr, celite, wood meal, tobacco dust, ground walnut shells and ground cocoanut shells. In these ducts the concentration of the active compound usually lies between about 1–22% by weight.

The active compounds of the invention may also be applied to the crops in the form of suspensions in a volatile liquid usually water. In preparing such a suspension the active compound is formed into a wettable powder and then dispersed in a volatile solvent such as water. In the formulation of the wettable powder the active compound is ground with a solid carrier of the type employed in forming a dust and a suitable dispersion agent such as a lignin sulfonate or a naphthalene sulfonate and/or a suitable wetting agent such as a fatty acid sulfonate, and alkaryl sulfonate or an acid condensation product of the type sold under the trademark "Igepon" are added. In the wettable powder the concentration of the active compound may vary between wide limits. However, a concentration of between about 10 to 80% by weight is usually preferred.

Finally the active compounds of the invention may be applied to the crops in the form of emulsions in water or other volatile liquids. In preparing these emulsions the active compound is first formed into a miscible oil. These miscible oils contain besides the active compound a water insoluble solvent for the active compound and an emulsifier. Among solvents that may be employed are xylene, toluene, dioxane, aromatic petroleum distillates such as solvent naphtha, distilled tar oil, tetralene and cyclohexane and mixtures of these liquids. Among the emulsifiers that may be employed are the alkyl phenoxy-glycol ethers, polyoxyethylene sorbitan esters of fatty acids, polyoxyethylene-sorbitolesters of fatty acids and the emulsifiers known by the trademarks "Tween," "Triton" and "Atlox." The concentration of the active-compound in the solvent is usually about 2–50% by weight and in the emulsion the concentration of the active compound is usually between about 0.01 to 0.5% by weight.

While we have described our invention in connection with specific embodiments and applications, other modifications thereof will be readily apparent to those skilled in this art without departing from the spirit and scope of the invention as defined in the appended claims.

What we claim is:

1. Bis (N,N-dimethylamido)-O-(2-ethoxy-3,5-dimethyl-1,4-pyronyl)-6-phosphate.
2. Bis (N,N-dimethylamido)-O-(2-methoxy-3,5-dimethyl-1,4-pyronyl)-6-phosphate.
3. Bis (N,N-dimethylamido)-O-(2-methyl-1,4-pyronyl)-6-phosphate.
4. Bis (N,N-dimethylamido)-O-2-keto-4-methyl-2,5-dihydrofuranyl-6-phosphate.
5. Bis (N,N-dimethylamido)-O-coumarinyl-4-phosphate.
6. The method of destroying plant harmful fungi comprising contacting said fungi with a fungicidally effective amount of a compound of claim 7.
7. A phosphorus containing heterocyclic compound of the formula:

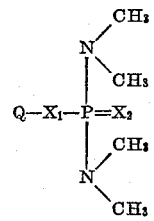

wherein Q is a heterocyclic member selected from the group consisting of 1,2-pyronyl, 1,4-pyronyl, 1,2-benzopyronyl, chromonyl, 2,3 benzopyronyl, tetronyl, maleic anhydride, 2-furanone and unsubstituted 1–6 carbon alkyl and unsubstituted 1–6 carbon alkoxy derivatives thereof, $X_1$ is a member of the group consisting of oxygen and sulfur and $X_2$ is a member of the group consisting of oxygen and sulfur and $X_1$ is directly attached to a heterocyclic ring carbon of Q.

8. The compound of claim 7 wherein $X_1$ and $X_2$ are each oxygen and Q is 1,4-pyronyl.

9. The method of destroying red spider mites comprising contacting said mites with a compound of claim 7.

References Cited in the file of this patent
UNITED STATES PATENTS
2,657,229   Orochena _____ Oct. 27, 1953

OTHER REFERENCES
Frear: "Chemistry of Insecticides," Van Nostrand, New York (1955), pages 76, 77, 79, 88 and 91.

UNITED STATES PATENT OFFICE
CERTIFICATE OF CORRECTION

Patent No. 3,051,615 August 28, 1962

Jan Hendrik Uhlenbroek et al.

It is hereby certified that error appears in the above numbered patent requiring correction and that the said Letters Patent should read as corrected below.

In the heading to the printed specification, line 9, for "Nov. 9, 1959" read -- Feb. 23, 1959 --.

Signed and sealed this 19th day of March 1963.

(SEAL)
Attest:

ESTON G. JOHNSON
Attesting Officer

DAVID L. LADD
Commissioner of Patents